United States Patent
Lopez et al.

(10) Patent No.: US 10,507,902 B2
(45) Date of Patent: Dec. 17, 2019

(54) WIND TURBINE DOME AND METHOD OF ASSEMBLY

(71) Applicant: General Electric Company, Schenectady, NY (US)

(72) Inventors: Fulton Jose Lopez, Clifton Park, NY (US); Daniel Jason Erno, Clifton Park, NY (US); Peggy Lynn Baehmann, Glenville, NY (US); Robert Michael Zirin, Marblehead, MA (US)

(73) Assignee: General Electric Company, Schenectady, NY (US)

( * ) Notice: Subject to any disclaimer, the term of this patent is extended or adjusted under 35 U.S.C. 154(b) by 1018 days.

(21) Appl. No.: 14/692,266

(22) Filed: Apr. 21, 2015

(65) Prior Publication Data
US 2016/0311519 A1    Oct. 27, 2016

(51) Int. Cl.
*B64C 7/00* (2006.01)
*F03D 1/06* (2006.01)

(52) U.S. Cl.
CPC .............. *B64C 7/00* (2013.01); *F03D 1/0691* (2013.01); *Y02E 10/721* (2013.01)

(58) Field of Classification Search
CPC ............ F03D 1/0691; F03D 1/04; B64C 7/00
See application file for complete search history.

(56) References Cited

U.S. PATENT DOCUMENTS 4,366,386 A    12/1982 Hanson
5,669,758 A *  9/1997 Williamson .............. F03D 1/04
                                                        416/4

(Continued)

FOREIGN PATENT DOCUMENTS

EP    2108819 A2    10/2009
EP    2292926 A1    3/2011

(Continued)

OTHER PUBLICATIONS

John M et al., "Wind Noise Suppression for Infrasound Sensors", Army Research Lab Adelphi MD Computational and Information Sciences Directorate, Pagination or Media Count : 32, Oct. 2012-Sep. 2013.

(Continued)

*Primary Examiner* — Woody A Lee, Jr.
*Assistant Examiner* — Michael L Sehn
(74) *Attorney, Agent, or Firm* — Mary Louise Stanford

(57) ABSTRACT

An aerodynamic dome component that is placed in front of a wind turbine hub includes an outer ring, a central axle disposed relative to the outer ring, a plurality of radially extending tensioning members and a skin-like covering. The plurality of radially extending tensioning members are coupled to the outer ring at a first end and to the central axle at a second end. The outer ring, the plurality of radially extending tensioning members and the central axle together form an underlying dome support structure. The skin-like covering is configured to envelop at least a portion of the underlying dome support structure to form at least a portion of the aerodynamic dome component and define a front dome portion. The skin-like covering enveloping at least a portion of the underlying dome support structure may further define a rear dome portion, wherein the rear dome portion is configured downwind from the front dome portion.

19 Claims, 9 Drawing Sheets

(56) References Cited

U.S. PATENT DOCUMENTS

| | | | |
|---|---|---|---|
| 6,358,014 | B1 | 3/2002 | Chou et al. |
| 6,602,045 | B2 | 8/2003 | Hickey |
| 6,755,608 | B2 | 6/2004 | Boughton |
| 6,942,461 | B2 | 9/2005 | Wobben |
| 7,204,674 | B2 | 4/2007 | Wobben |
| 7,329,099 | B2 | 2/2008 | Hartman |
| 7,381,029 | B2 | 6/2008 | Moroz |
| 7,708,530 | B2 | 5/2010 | Wobben |
| 7,740,450 | B2 | 6/2010 | Cairo |
| 7,780,417 | B2 | 8/2010 | Kirchner et al. |
| 7,828,523 | B2 | 11/2010 | Bonnet |
| 7,837,442 | B2 | 11/2010 | Kirtley et al. |
| 7,874,805 | B2 | 1/2011 | Pedersen |
| 7,914,261 | B2 | 3/2011 | Wobben |
| 7,997,870 | B2 | 8/2011 | Neumann |
| 8,287,243 | B2 | 10/2012 | Herr et al. |
| 8,317,469 | B2 | 11/2012 | Kinzie et al. |
| 8,317,479 | B2 | 11/2012 | Vronsky et al. |
| 8,337,161 | B2 | 12/2012 | Aarhus |
| 2009/0148291 | A1 | 6/2009 | Gerber et al. |
| 2009/0208337 | A1* | 8/2009 | Chambers ............ F03D 1/0658 416/210 R |
| 2011/0142636 | A1 | 6/2011 | Curtin |
| 2012/0134833 | A1 | 5/2012 | Mashue |
| 2013/0177444 | A1 | 7/2013 | Bech et al. |
| 2014/0003940 | A1 | 1/2014 | Opaits et al. |
| 2014/0140851 | A1 | 5/2014 | Khan |
| 2014/0169963 | A1 | 6/2014 | Carreker |
| 2015/0010403 | A1 | 1/2015 | Wilson et al. |
| 2015/0354233 | A1 | 12/2015 | Ebbesen et al. |

FOREIGN PATENT DOCUMENTS

| | | | | |
|---|---|---|---|---|
| EP | 2363601 | A2 | 9/2011 | |
| GB | 2466209 | A | 6/2010 | |
| GB | 2495084 | A | 4/2013 | |
| WO | 2001042647 | A2 | 6/2001 | |
| WO | 2003060319 | A1 | 7/2003 | |
| WO | 2010048959 | A3 | 12/2010 | |
| WO | 2011050806 | A2 | 5/2011 | |
| WO | WO-2012130292 | A1 * | 10/2012 | ............ F03D 80/30 |
| WO | 2013017623 | A1 | 2/2013 | |
| WO | 2014108216 | A1 | 7/2014 | |

OTHER PUBLICATIONS

Baehmann et al., "Wind Turbine Dome and Method of Assembly", GE co-pending U.S. Appl. No. 14/183,892, filed Feb. 19, 2014.

European Search Report and Opinion issued in connection with corresponding EP Application No. 16165312.6 dated Aug. 23, 2016.

* cited by examiner

WIND TURBINE DOME AND METHOD OF ASSEMBLY

BACKGROUND

The subject matter of this disclosure relates generally to wind turbines, and more particularly, to an aerodynamic dome structure that is placed in front of a wind turbine hub for increasing the aerodynamic efficiency of an existing wind turbine. In particular, embodiments disclosed herein relate to methods of manufacturing and assembling dome structures that enable an acceleration of an airflow into more aerodynamically efficient region of a wind turbine rotor blade providing an increase in efficiency of an existing wind turbine.

Wind power is considered one of the cleanest, most environmentally friendly energy sources presently available, and wind turbines have gained increased attention in this regard. A modern wind turbine typically includes a tower, generator, gearbox, nacelle, rotor hub and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. However, as the size of wind turbines increases, so do the respective costs of manufacturing, transporting, and assembly of the wind turbines. Thus, the economic benefits of increased wind turbine sizes must be weighed against these factors. For example, the costs of manufacturing, transporting, and/or assembling aerodynamic components for a larger wind turbine may significantly impact the economic advantage of providing such a wind turbine. One such aerodynamic component comprises a dome-shaped aerodynamic component (referred to herein as "dome") that is placed in front of a wind turbine hub to enable an acceleration of the airflow into more aerodynamically efficient region of a wind turbine rotor blade and thus provide an increase in efficiency of an existing wind turbine.

Accordingly, there is a need for a wind turbine dome that increases efficiency of wind turbines by enabling an acceleration of an airflow into more aerodynamically efficient region of a wind turbine rotor blade while reducing the associated transportation and/or assembly costs of the wind turbine.

BRIEF DESCRIPTION

According to one embodiment, an aerodynamic dome component for a wind turbine is disclosed. The aerodynamic dome component comprises an outer ring, a central axle disposed relative to the outer ring, a plurality of radially extending tensioning members and a skin-like covering. The plurality of radially extending tensioning members are coupled to the outer ring at a first end and to the central axle at a second end. The outer ring, the plurality of radially extending tensioning members and the central axle together form an underlying dome support structure. The skin-like covering enveloping at least a portion of the underlying dome support structure to form at least a portion of the aerodynamic dome component and define a front dome portion.

According to another embodiment, an aerodynamic dome component for a wind turbine is disclosed. The aerodynamic dome comprises a skin-like covering and an underlying dome support structure supporting the skin-like covering to define a front dome portion. The underlying dome support structure comprising a central axle, at least one outer ring segment disposed about said central axle and a plurality of radially extending tensioning members. The plurality of radially extending tensioning members are coupled to the at least one outer ring segment at a first end and to the central axle at a second end and configured to allow for tensioning of the radially extending tensioning members.

According to yet another embodiment, a method assembling an aerodynamic dome component for a wind turbine is disclosed. The method comprises providing a central axle, interconnecting a plurality of arcuate ring segments to form an outer ring having one of a parabolic or semi-spherical outer shape disposed about the central axle, coupling a plurality of radially extending tensioning members to the outer ring and the central axle to form an underlying dome support structure, tensioning the plurality of radially extending tensioning members and attaching via at least one attachment mechanism, a skin-like covering to the underlying dome support structure to form a front dome portion.

DRAWINGS

These and other features, aspects, and advantages of the present disclosure will become better understood when the following detailed description is read with reference to the accompanying drawings, wherein.

Figure 1:
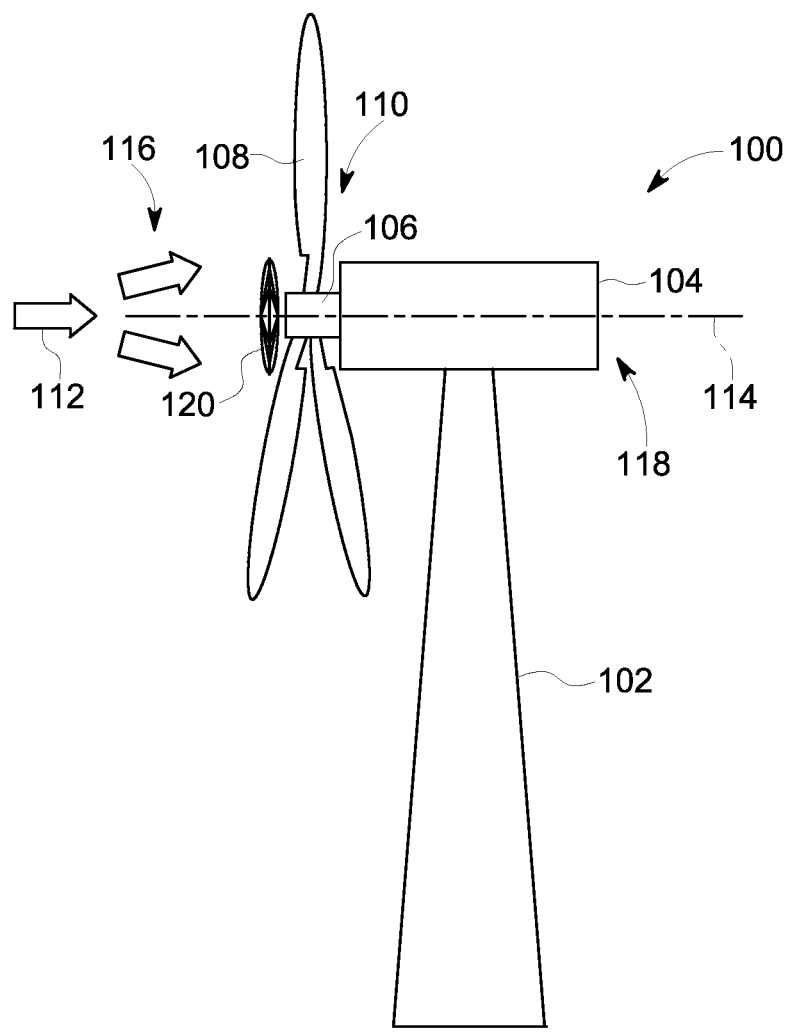
FIG. 1 is a schematic side view of a wind turbine including an aerodynamic dome component placed in front of a turbine hub, in accordance with an exemplary embodiment.

While the above-identified drawing figures set forth particular embodiments, other embodiments of the present disclosure are also contemplated, as noted in the discussion. In all cases, this disclosure presents illustrated embodiments of the present disclosure by way of representation and not limitation. Numerous other modifications and embodiments can be devised by those skilled in the art which fall within the scope and spirit of the principles of this disclosure.

DETAILED DESCRIPTION

Reference now will be made in detail to various embodiments, one or more embodiments of which are illustrated in the drawings. Each embodiment is provided by way of explanation, not limitation. In fact, it will be apparent to those skilled in the art that various modifications and variations can be made without departing from the scope or spirit of the disclosure. For instance, features illustrated or described as part of one embodiment can be used with another embodiment to yield a still further embodiment. Thus, it is intended that such modifications and variations come within the scope of the appended claims and their equivalents.

In general, the present subject matter is directed to an aerodynamic dome component for a wind turbine. The dome component may cover a rotor hub or both a rotor hub and possibly a portion of the wind turbine blades, depending upon the particular application. The costs associated with transporting such a dome component to a wind turbine site and/or assembling the dome component may be significantly reduced. For example, in one embodiment, the dome component, and more particularly an underlying dome support structure may be transported and shipped in segments to the wind turbine site and/or assembled together at the wind turbine site (e.g., at a location near the wind turbine tower or aloft using a crane or other suitable lifting mechanism). After the underlying dome support structure is assembled, an outer skin-like covering may be installed relative to the underlying dome support structure. In one embodiment, repairs are more easily implemented by replacing a single section of the underlying structure and/or one or more segments of the outer skin-like covering, as contrasted with replacing a complete dome structure. In another embodiment, the dome structure is field assembled without the use of welds or attachment hardware such as bolts.

Referring now to the drawings, FIG. 1 illustrates in a simplified perspective view, an embodiment of a wind turbine 100. The wind turbine 100 includes a tower 102 with a nacelle 104 mounted thereon. Within the nacelle 104 a generator (not shown) for producing electrical current is placed. The generator is connected to a rotor hub assembly 106 with a substantial horizontal shaft. A plurality of rotor blades 108 are mounted to the rotor hub assembly 106 and configured to rotate about an axis (horizontal or vertical) at a rate determined by the wind speed and the shape of the plurality of rotor blades 108. Typically the plurality of rotor blades 108 includes two or more rotor blades. The plurality of rotor blades 108 and the rotor hub assembly 106 form a rotor 110 of the wind turbine 100. An aerodynamic dome component 120 (described presently) is positioned in front of and upwind from the rotor hub assembly 106. In operation the wind, indicated by directional arrows 112, imparts a rotation on the rotor 110 due to an aerodynamic profile on the plurality of rotor blades 108. More specifically, in the illustrated embodiment, the rotor 110 turns around a substantially horizontal rotor axis 114, which is substantially parallel to the wind direction 112. The rotor 110 drives the generator, such that electrical energy is produced from the kinetic energy of the wind 112.

It should be noted that relative adjectives like in front, backward, upwind, behind and rear are defined with respect to the wind direction 112 related to a wind turbine 100 in operation, i.e. when the wind turbine 100 produces electrical energy. That means that the wind 112 flows from a front end 116 to a back end 118 of the wind turbine 100. In addition, the terms axial or radial relate to the rotor axis 114 of the rotor hub assembly 106, when the wind turbine 100 produces electrical energy. Thus, as described herein, the rotor axis 114 is substantially parallel to the wind 112 direction.

It should be appreciated that the wind turbine 100 of FIG. 1 is provided for illustrative purposes only to place the present subject matter in an exemplary field of use. Thus, one of ordinary skill in the art should understand that the present subject matter is not limited to any particular type of wind turbine configuration. The rotor hub assembly 106 including the aerodynamic dome 120 advantageously is capable of withstanding the external wind loadings as well as the loads provoked by the wind turbine operation.

Figure 2:
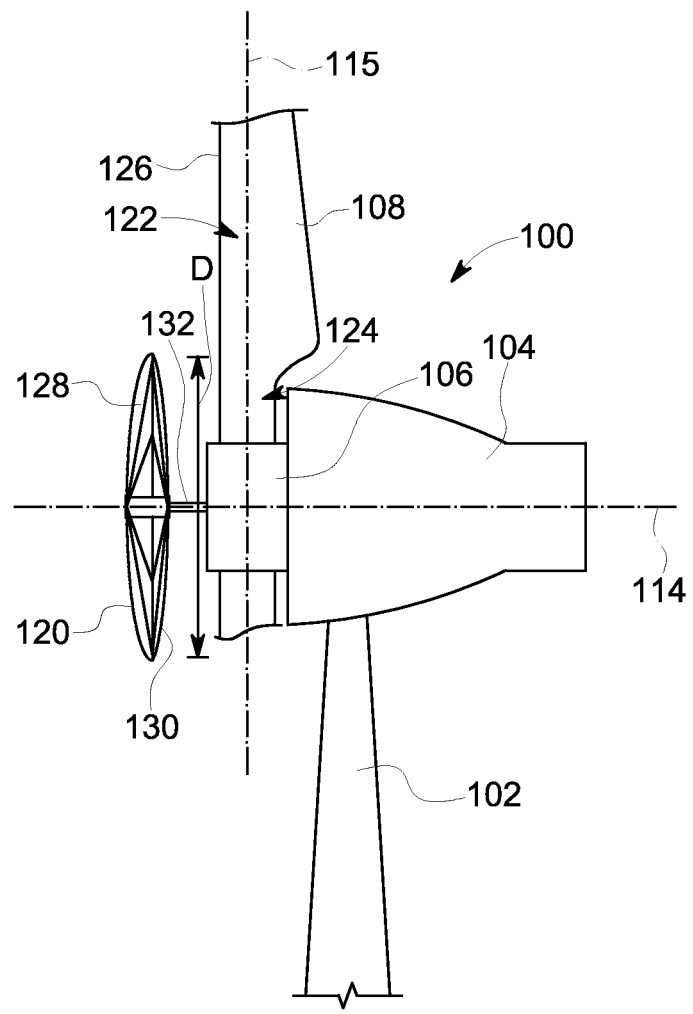
FIG. 2 is an enlarged schematic side view of the wind turbine including the aerodynamic dome component of FIG. 1, in accordance with one or more embodiments shown or described herein.

Referring again to the drawings wherein identical reference numerals denote the same elements throughout the various views, FIG. 2 depicts in an enlarged simplified schematic drawing, a portion of the wind turbine 100 according to an embodiment. For the sake of simplicity, only a portion of the plurality of rotor blades 108 is shown. Each of the plurality of rotor blades 108 has an outer portion 122 and an inner portion 124. The terms "outer" and "inner" are used with respect to the rotor hub assembly 106. Therefore, the outer portion 122 of each of the plurality of rotor blades 108 is radially outside of the inner portion 124 in FIG. 2. The inner portion 124 of each of the plurality of rotor blades 108 is connected to the rotor hub assembly 106. Each rotor blade 108 may be, in a typical embodiment, turned around its longitudinal axis 115 to adjust a pitch angle. For that purpose a pitch mechanism (not shown) is located in the rotor hub assembly 106 and/or the nacelle 104 of the wind turbine 100. In an embodiment, the outer portion 122 of each of the rotor blades 108 has a wing shaped profile, such that the outer portion may also be called a profiled section or profiled outer portion 122 of the rotor blade 108. The front end of each of the plurality of rotor blades 108 is typically straight from the connection to the hub to the outer portion 122; in another typical embodiment of the present disclosure, the front end of each of the plurality of rotor blades 108 is typically straight to the blade tip of each of the rotor blades 108. Thus, a leading edge 126, i.e. the windward or front edge of each of the plurality of rotor blades 108, defines during operation of the wind turbine 100, i.e. when the rotor hub assembly 106 and the rotor blades 108 turn around the rotor axis 114, a substantially flat disk. Thus, the outer end of the inner portion 124, approximately where the profiled portion begins, i.e. where each of the rotor blades 108 start the leeward protrusion in the embodiment shown in FIG. 2 when looking from a hub sided end of the rotor blade 108 to the blade tip, is defining a circle around the rotor axis 114.

As illustrated in FIG. 2, in front, i.e. windward, of the plurality of rotor blades 108, the aerodynamic dome component 120 according to an embodiment is symmetrically disposed with respect to the turning axis 114. In the illustrated embodiment, the aerodynamic dome component 120 resembles a substantially disk-like structure, having a generally flattened front and rear dome shape including a plurality of tensioned spokes (described presently) and a skin-like covering (described presently). In an embodiment, the aerodynamic dome component 120 may be attached to the wind turbine rotor hub assembly 106 or hub extension structures (not shown), depending upon the application. Other embodiments may be attached to the plurality of rotor blades 108. In an embodiment, the aerodynamic dome component 120 defines a front dome portion 128 and a rear dome portion 130, when a skin-like covering (described presently) is attached to both the front and rear underlying dome structures (described presently). In an embodiment, the front dome portion 128 is configured more hemispherical from the rear dome portion 130, meaning the rear dome portion 130 is more flattened in shape, and located upwind from axis 115 of the plurality of rotor blades 108. The rear dome portion 130 is configured downwind from the front dome portion 128 and minimizes the wind impact when the wind direction is larger than 90 degrees. In an alternate embodiment, the front dome portion 128 and the rear dome portion 130 are configured substantially equivalent in overall shape.

The aerodynamic component 120 may be connected to the rotor hub assembly 106 via a shaft 132, or connected to an existing small spinner (not shown) mounted on the hub of the wind turbine 100. In the last case, the aerodynamic dome component 120 covers the small spinner. Thus, the aerodynamic dome component 120 may be a nose cone of the rotor hub assembly 106. The aerodynamic dome component 120 is in a typical embodiment symmetrically placed with respect to the turning axis 114 when mounted on the wind turbine 100. In an embodiment, the aerodynamic dome component 120 may have a parabolic or semi-spherical outer shape, as best illustrated in FIG. 2, or any other generally substantially spherical shape capable of redirecting the airflow as indicated herein. The aerodynamic dome component 120 guides or redirects incoming wind 112 that is typically directed toward the rotor hub assembly 106 or to the nacelle 104 toward the profiled or outer portions 122 of each of the plurality of rotor blades 108. Thus, kinetic energy of the wind 112 directed toward the rotor hub assembly 106 is also capable of being transformed it to electrical energy.

In an embodiment, the aerodynamic dome component 120 has a maximum outer diameter D in front of the plurality of rotor blades 108 that is corresponding substantially to a diameter of the circle defined by the outer end of the inner portion 124 in operation of the wind turbine 100. In an embodiment, the maximum outer diameter D might also be slightly greater or smaller than the circle. Hence, the wind 112 directed to the rotor hub assembly 106 and the nacelle 104 is directed along the aerodynamic dome component 120 to the outer portion 122 of the plurality of rotor blades 108, as indicated by arrows 112. The aerodynamic shape of the aerodynamic dome component 120 causes an acceleration in the flow of wind 112 over the more aerodynamically efficient regions of each of the plurality of rotor blades 108.

Figure 3:
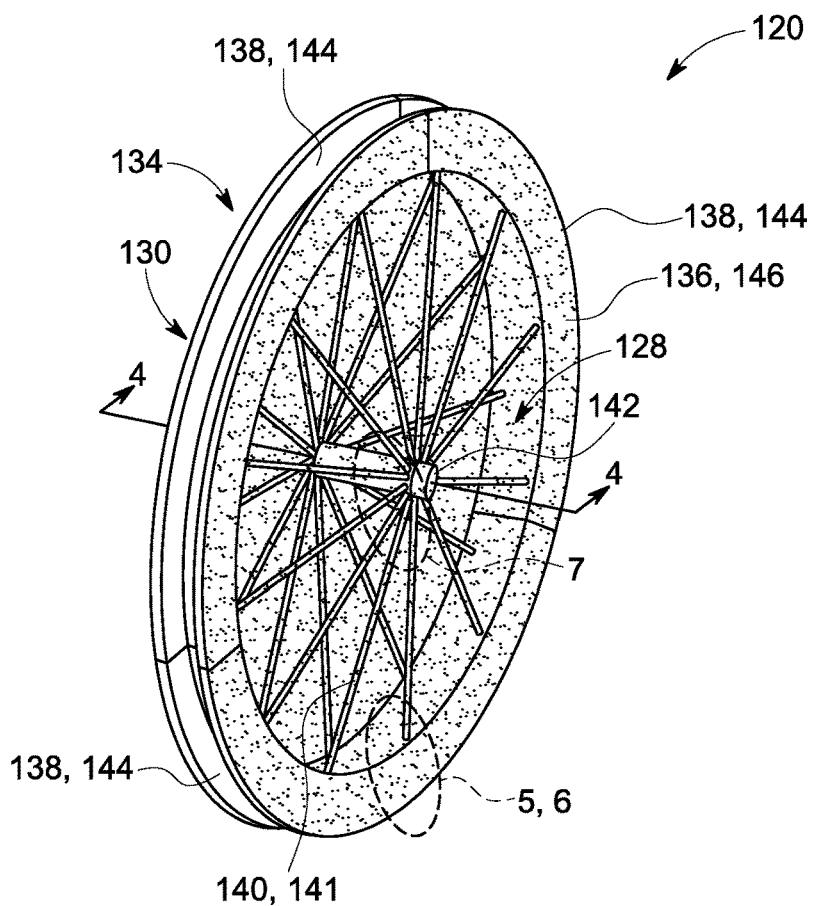
FIG. 3 illustrates in a simplified perspective view the aerodynamic dome component of FIG. 1, in accordance with one or more embodiments shown or described herein.
Figure 4:
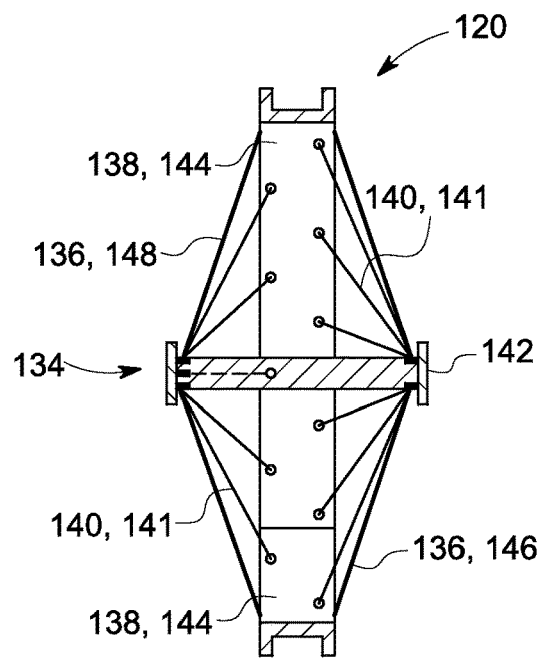
FIG. 4 illustrates in a simplified cross-section view taken through line 4-4 of FIG. 3, the aerodynamic dome component of FIG. 1, in accordance with one or more embodiments shown or described herein.

Referring now to FIGS. 3 and 4, as illustrated, the aerodynamic dome component 120 comprises an underlying dome support structure 134 and a skin-like covering 136. The underlying dome support structure 134 is generally comprised of an outer ring 138, a plurality of radially extending tensioning members 140 and a central axle 142. The skin-like covering 136 may include one or more segments positioned to define the front dome portion 128 and the rear dome portion 130. In an embodiment, the skin-like covering 136 may be comprised of a tensionable fabric, metal, polycarbonate, plastic, composite, composite sandwich panel, or any other suitable material capable of creating a flow blockage and redirecting the incoming wind 112 as described herein. In an embodiment, the skin-like covering 136 is attached to the underlying dome support structure 134. The outer ring 138 may comprise any type of beam or channel, e.g. square, rectangular, box, C or U shaped, or any beam or channel shape so long as the resultant structure can be applied according to the principles described herein. In the illustrated embodiment, the outer ring 138 comprises a U-shaped channel-frame cross-section structure. In an embodiment, the outer ring 138 may comprise a plurality of arcuate ring segments 144. In a preferred embodiment, the outer ring 138 is comprised of three or more ring segments 144 for ease in transportation to site. On-site, the three more ring segments 144 may be coupled to one another, via clamping, or by some other coupling device. In an embodiment, the three or more ring segments 144 are clamped together with an internal or external spline or clamping plate.

In the embodiment illustrated in FIGS. 3 and 4, the outer ring 138 is comprised of three ring segments 144, the plurality of radially extending tensioning members 140 are comprised of a plurality of steel cables 141 and the skin-like covering 136 is comprised of a front segment 146 and a rear segment 148. In an alternate embodiment, the plurality of radially extending tensioning members 140 may be comprised of a carbon fiber or any other high strength material. As best illustrated in FIG. 4, the configuration of the plurality of radially extending tensioning members 140 relative to the axle 142 and outer ring 138 provides for the overall shape of the underlying dome structure 134.

Figure 5:
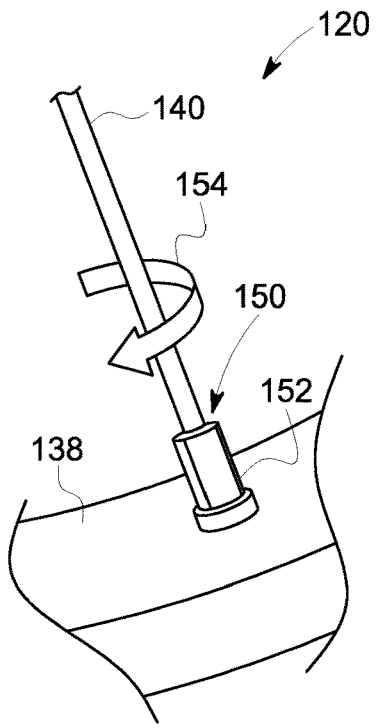
FIG. 5 illustrates in a simplified perspective view features of the aerodynamic dome component of FIG. 1, in accordance with one or more embodiments shown or described herein.
Figure 6:
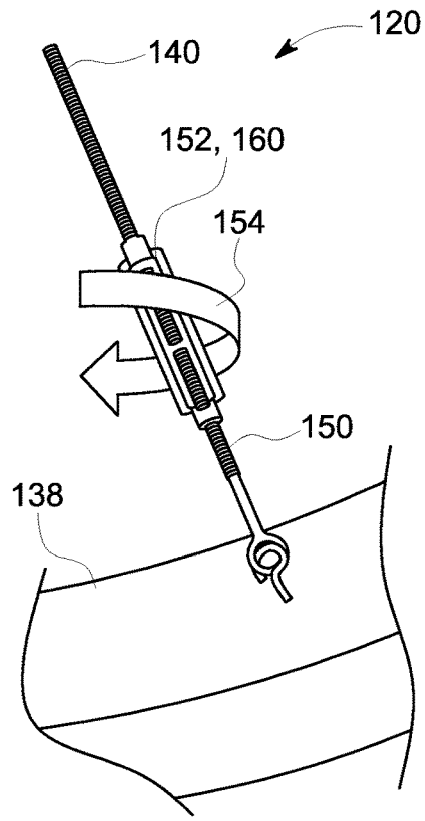
FIG. 6 illustrates in a simplified perspective view an alternate embodiment of features of the aerodynamic dome component of FIG. 1, in accordance with one or more embodiments shown or described herein.
Figure 7:
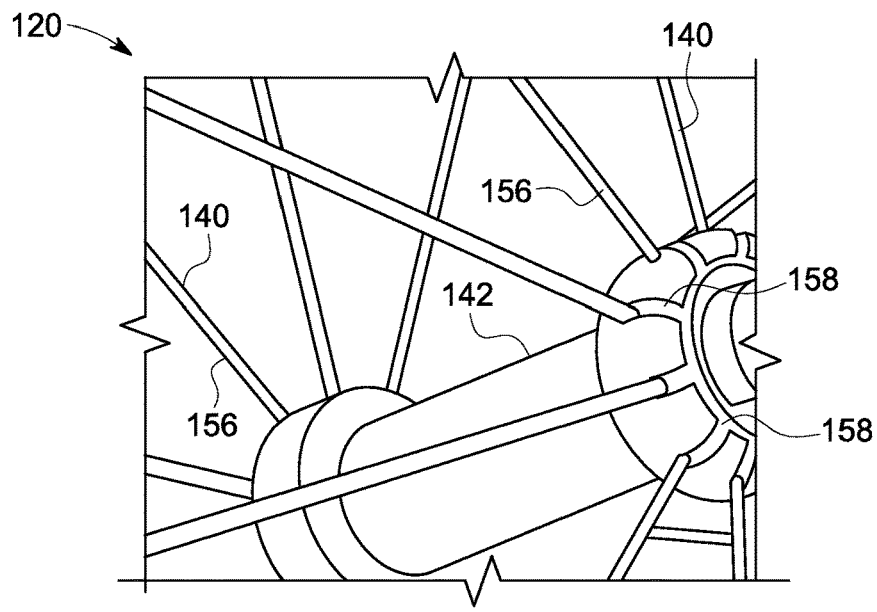
FIG. 7 illustrates in a simplified perspective view features of the aerodynamic dome component of FIG. 1, in accordance with one or more embodiments shown or described herein.

Referring now to FIGS. 5-7, illustrated are portions of the aerodynamic dome component 120 as referenced by dotted lines in FIG. 3. More particularly, illustrated is a single radially extending tensioning member 140 positioned relative to the outer ring 138 (FIGS. 5 and 6) and the plurality of radially extending tensioning members 140 positioned relative to the axle 142 (FIG. 7). Referring more specifically to FIG. 5, to provide tensioning of the plurality of radially extending tension members 140, each tensioning member 140 has positioned at a first end 150 proximate the outer ring 138, a tensioning component 152. The tensioning component 152 provides rotational movement of each of the plurality of radially extending tensioning members 140 and/or the associated tensioning component 152, as indicated by directional arrow 154, relative to the outer ring 138. This rotational movement translates into an increase/decrease in tension to provide the desired tensioning of the associated tensioning member 140. Tensioning of each of the plurality of radially extending tensioning members 140 permits overall strength of the aerodynamic dome component 120, thus enabling the component to carry large loads when compared to its overall weight. Alternative means of coupling each of the radially extending tensioning members 140 relative to the axle 142 and outer ring 138 are anticipated herein, such as by turn-buckle coupling 160 as best illustrated in FIG. 6, or other similar coupling capable of providing an increase or decrease in tension of the radially extending tensioning members 140.

Referring more specifically to FIG. 7, in an embodiment, a second end 156 of each of the plurality of radially extending tensioning members 140 is positioned relative to the central axle 142. In this particular embodiment, each of the radially extending tensioning members 140 is fixedly positioned within a slot 158 formed in the central axle 142. This fixed coupling permits rotational movement of each of the plurality of radially extending tensioning members 140 as described with respect to FIGS. 5 and 6.

Figure 8:
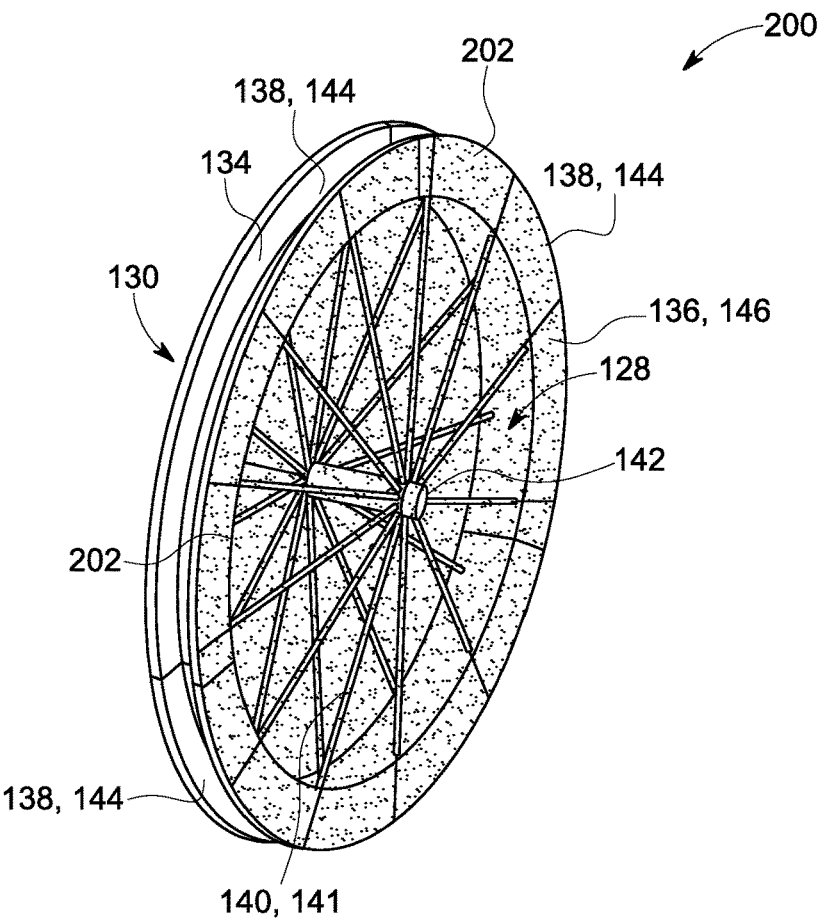
FIG. 8 illustrates in a simplified perspective view an alternate embodiment of an aerodynamic dome component, in accordance with one or more embodiments shown or described herein.
Figure 9:
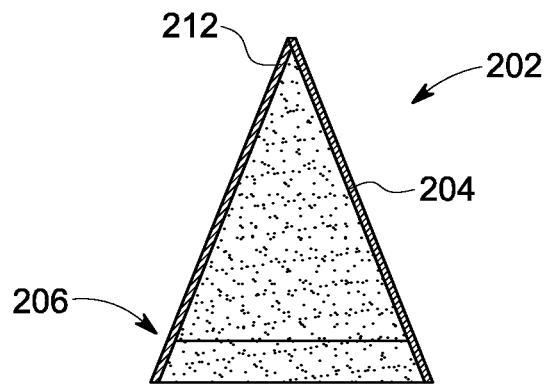
FIG. 9 illustrates in a simplified plan view features of the aerodynamic dome component of FIG. 8, in accordance with one or more embodiments shown or described herein.
Figure 10:
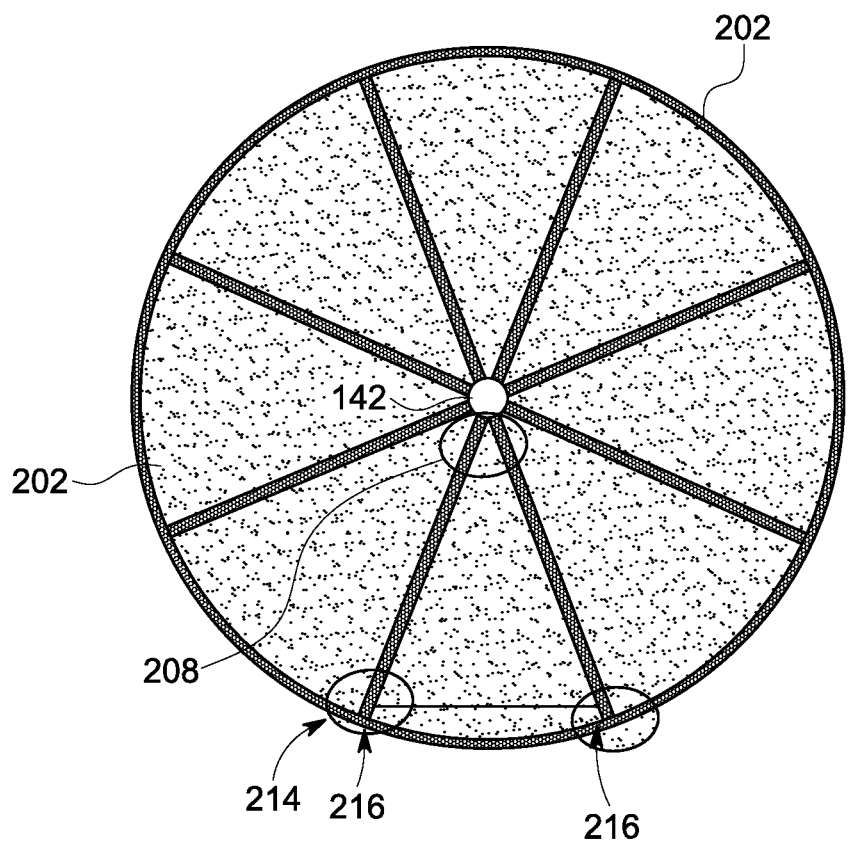
FIG. 10 illustrates in a simplified plan view features of the aerodynamic dome component of FIG. 8, in accordance with one or more embodiments shown or described herein.

As previously indicated, in the embodiment illustrated in FIGS. 3 and 4, the skin-like covering 136 is formed of the front segment 146 and the rear segment 148, defining the front dome portion 128 and the rear dome portion 130. Referring more specifically to FIGS. 8-10, illustrated is an alternate embodiment of an aerodynamic dome component 200, generally similar to the aerodynamic dome component 120 previously described. As previously indicated, identical reference numerals denote the same elements throughout the various views.

In the embodiment of FIGS. 8-10, the aerodynamic dome component 200 comprises an underlying dome support structure 134 and a skin-like covering 136. The underlying dome support structure 134 is generally comprised of an outer ring 138, a plurality of radially extending tensioning members 140 and a central axle 142. The skin-like covering 136 may include one or more segments positioned to form a front dome portion 128 and a rear dome portion 130. In contrast to the previously described embodiments, in the illustrated embodiment of FIGS. 8-10, the skin-like covering 136 is comprised of a plurality of pie-shaped segments 202 when viewed from a direction substantially orthogonal to an outermost surface of the skin-like covering 136. A single pie-shaped segment 202 of the aerodynamic dome structure 200 is illustrated in FIG. 9. Each of the pie-shaped segments 202 comprises, without limitation, a fabric, metal, polycarbonate, plastic, composite, or a composite sandwich panel 204 that may be attached to its own pie-shaped segment frame 206. The plurality of pie-shaped segments 202 are attached to the underlying support structure 134. The underlying dome support structure 134, according to one embodiment, is configured with snaps/slots 208 near, proximal to, or adjacent to the central axle 142 of the underlying dome support structure 134. According to one embodiment the slots 208 are formed in the central axle 142. A plurality of protrusions 212 on the side or bottom of each of the segment frames 206 are configured to snap/slide respectively into the dome frame snaps/slots 208. Each of the segment frames 206 according to one embodiment are locked into place near its outer vertices 214 at the outer diameter of the underlying dome support structure 134 via one or more couplings 216, such as, but not limited to spring activated latches.

The full aerodynamic dome structure 200 is created according to an embodiment, by attaching the plurality of pie segments 202 to the underlying dome support structure 134, as best illustrated in FIG. 9. Separate pie-shaped pieces/segments 202 that will lie on top of the underlying dome support structure 134 are manufactured separately. The pie pieces/segments 202 are created in sections that match the underlying dome support structure 134. In one embodiment, the underlying dome support structure 134 may have slots or grooves 208 in the areas near the central axle 142. The segment frames 206 for the pie sections/segments 202 may have protrusions 212 that align with the slots or grooves 208. The pie-shaped segment frames 206 can be easily slid/snapped into place while uptower or on the ground. The pie-shaped segment frames 206 may be locked into place at the outer diameter of the underlying dome support structure 134 with one or more couplings 216. The pie-shaped segments 202 may be constructed of a suitable fabric, polycarbonate, composite, e.g. glass or carbon, composite sandwich, e.g. glass or carbon with a lightweight core such as foam, or a suitable metal. In an alternate embodiment, the plurality of pie-shaped segments 202 may be bolted together and are also attached to the underlying dome support structure 134 using suitable attachment hardware based on a particular application, such as, but not limited to, a bolt, a rivet, crimping, double-sided tape, a hook and loop element, a protrusion and slot structure, and combinations thereof.

Figure 11:
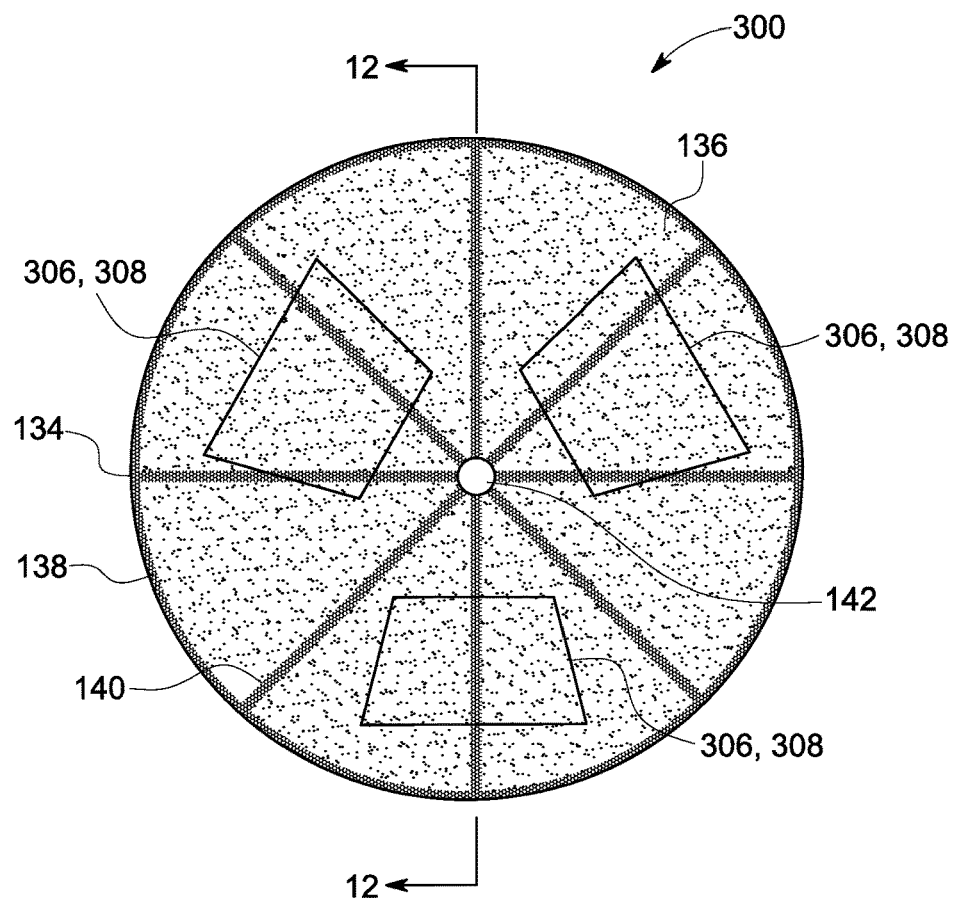
FIG. 11 illustrates in a simplified plan view an aerodynamic dome component, in accordance with one or more embodiments shown or described herein.
Figure 12:
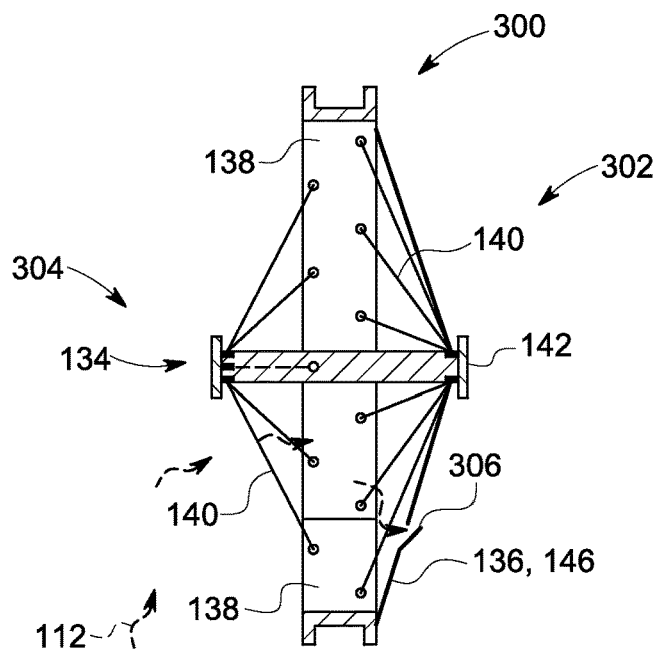
FIG. 12 illustrates in a simplified cross-section view taken through line 12-12 of FIG. 11, the aerodynamic dome component of FIG. 11, in accordance with one or more embodiments shown or described herein.
Figure 13:
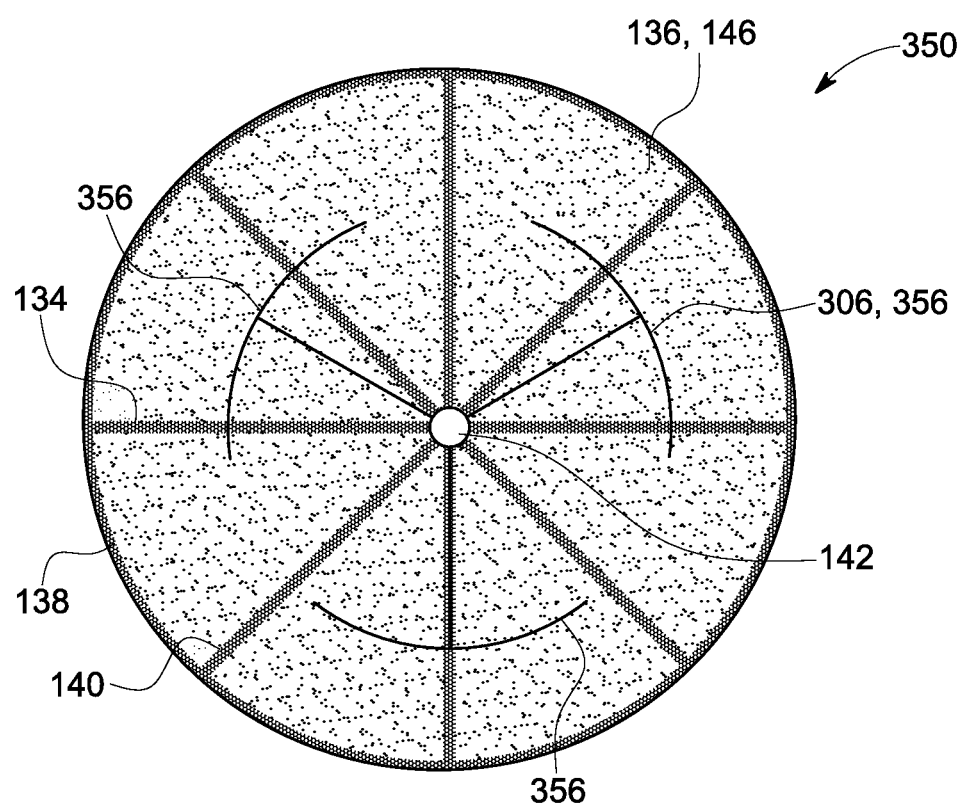
FIG. 13 illustrates in a simplified plan an aerodynamic dome component, in accordance with one or more embodiments shown or described herein.

Referring now to FIGS. 11-13, illustrated are alternate embodiments of an aerodynamic dome component, referenced 300 (FIGS. 11 and 12) and 350 (FIG. 13). As previously indicated, identical reference numerals denote the same elements throughout the various views. The aerodynamic dome components 300 and 350 are generally similar to the aerodynamic dome component 120 of FIGS. 1-4. Each of the aerodynamic dome components 300 and 350 comprises an underlying dome support structure 134 and a skin-like covering 136. The underlying dome support structure 134 is generally comprised of an outer ring 138, a plurality of radially extending tensioning members 140 and a central axle 142. In contrast to the embodiment of FIGS. 1-4, in the embodiments of the aerodynamic dome components 300 and 350 of FIGS. 11-13, the skin-like covering 136 is positioned only on a front side 302 of the underlying dome support structure 134, so as to define a front dome portion 128. A rear side 304 of the underlying dome support structure 134 does not include a skin-like covering 136 overlaying the underlying dome support structure 134. As previously described, the skin-like covering 136 may be comprised of a tensionable fabric, metal, polycarbonate, plastic, composite, composite sandwich panel, or any other suitable material capable of creating a flow blockage and redirecting the incoming wind 112 as described herein.

In the embodiments of FIGS. 11-13, the skin-like covering 136 is attached to the underlying dome support structure 134 and includes a single front segment 146 having one or more vent openings (described presently) formed therein to provide for the passage of wind 112 therethrough as desired. Referring more specifically to FIGS. 11 and 12, illustrated is the aerodynamic dome component 300 including the skin-like covering 136 including one or more vent openings 306 formed therein. In the embodiment of FIGS. 11 and 12, the vent openings 306 comprise one or more substantially trapezoidal shaped vent openings 308. It should be understood that although the vent openings 306 are illustrated in FIG. 11 as substantially trapezoidal in geometry, alternate geometric configurations for the vent openings 306 are anticipated by this disclosure. Referring more specifically to FIG. 13, illustrated is the aerodynamic dome component 350 including the skin-like covering 136 defining the one or more vent openings 306. In this particular embodiment, the one or more vent openings 306 are defined by one or more cuts 356 formed therein the skin-like covering 136. The one or more vent openings 306 of FIGS. 11-13 minimize the wind impact when the incoming wind 112 is greater than may be withstood by the aerodynamic dome component 300, 350. The one or more vent openings 306 allow the wind 112 to pass therethrough the skin-like covering 136, as best illustrated in FIG. 12. The one or more vent openings 306 are configured to permit the wind 112 to pass through the one or more vent openings 306 when the wind 112 is of sufficient strength to open the one or more vent openings 306. In an embodiment, the one or more vent openings 306 are mechanically attached about a perimeter to the remainder of the skin-like covering 136, or in a manner to maintain closure of the vent openings 136, such as by hook-and-loop closures or magnets, when the wind 112 is not of sufficient strength to open the one or more vent openings 306 as designed.

Figure 14:
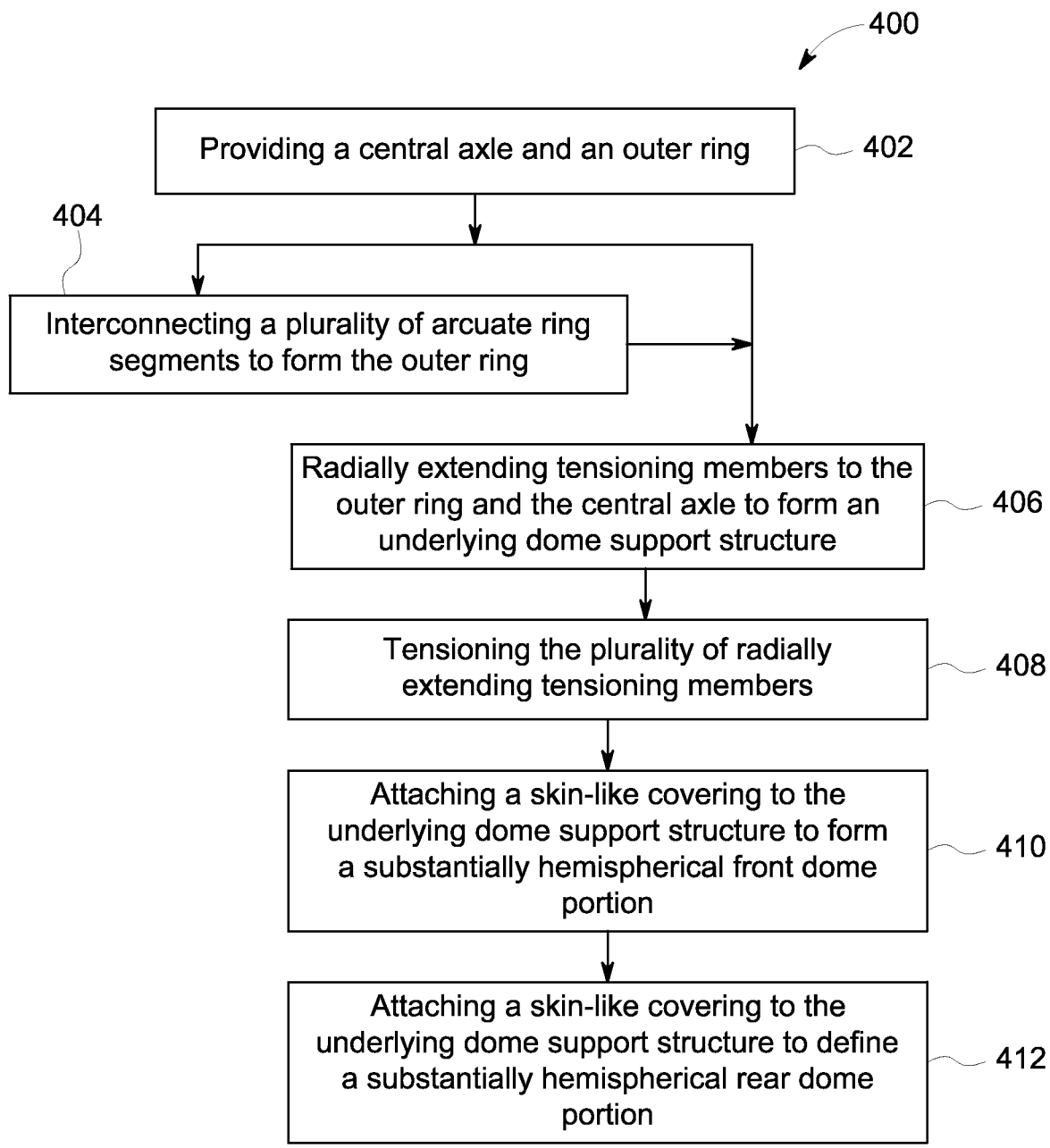
FIG. 14 illustrates in a simplified flow diagram, a method of assembling an aerodynamic dome component for a wind turbine, in accordance with one or more embodiments shown or described herein.

Referring now to FIG. 14, disclosed is a method of assembling an aerodynamic dome component for a wind turbine, such as the aerodynamic dome component 120, 200, 300 and 350 of FIGS. 1-13. The method includes a first step 402 of providing a central axle 142 and an outer ring 138. The step of providing the outer ring 138 may include a step 404 of interconnecting a plurality of arcuate ring segments 144 to form the outer ring 138 having one of a parabolic or semi-spherical outer shape. Next, in step 406 a plurality of radially extending tensioning members 140 are coupled to the outer ring 138 and the central axle 142 to form an underlying dome support structure 134. The plurality of radially extending tensioning members 140 are tensioned in a step 408. The skin-like covering 136 is next attached via at least one attachment mechanism, to the underlying dome support structure 134 to form a front dome portion 128, in step 410. The method 400 may further include attaching via at least one attachment mechanism, the skin-like covering 136 to the underlying dome support structure to define a rear dome portion 130, in a step 412.

The embodiments described herein with reference to FIGS. 1-14 advantageously allow a very large generally flat-like aerodynamic dome component defining a front dome portion 128 and an optional rear dome portion 130 to be easily transported and erected onsite. In an embodiment, a rear dome portion 130 is configured downwind from the front dome portion 128, or alternatively the front dome portion 128 may include one or more vent openings 306, to minimize the wind 112 impact on the aerodynamic dome component. In an embodiment, including both a front and rear dome portions 128, 130, the front dome portion 128 is configured more hemispherical from the rear dome portion 130, and located upwind from axis 115 (FIG. 1) of the plurality of rotor blades 108 (FIG. 1). In alternate embodiments, the front dome portion 128 and the rear dome portion 130 are configured substantially equivalent in overall shape and size. The principles described herein can be used to erect a dome more easily in uptower installations.

Some embodiments, such as those described herein with reference to FIGS. 3 and 4, employ a skin-like covering 136, and more specifically, a front segment 146 and a rear segment 148 that is tensioned about a perimeter of the outer ring 128 and find support from the plurality of radially extending tensioning members 140. Other embodiments, such as those described herein with reference to FIGS. 11-13, may employ a skin-like covering 136, and more particularly only a front segment 146 that is tensioned about a perimeter of the outer ring 128 and find support from the plurality of radially extending tensioning members 140.

In yet other embodiments, such as those described herein with reference to FIGS. 8-10, a skin-like covering 136 may be employed, and more specifically, a plurality of pie-shaped segments 202 that are placed directly onto the underlying dome support structure 134. Such pie-shaped segments 202 can be attached to the corresponding portions of the underlying dome support structure 134, and more particularly the outer ring 138 and the plurality of radially extending tensioning members 140, using, without limitation, snaps, bolts, rivets, double sided tape, hook and loop or a combination thereof.

While the invention has been described in terms of various specific embodiments, those skilled in the art will recognize that the invention can be practiced with modification within the spirit and scope of the claims.

The invention claimed is:

1. An aerodynamic dome component for a wind turbine, the aerodynamic dome comprising:
   an outer ring;
   a central axle disposed relative to the outer ring;
   a plurality of radially extending tensioning members responsive to a rotational force exerted thereon to increase or decrease tension of a respective radially extending tensioning member, each of the plurality of radially extending tensioning members coupled to the outer ring at a first end and to the central axle at a second end, wherein the outer ring, the plurality of radially extending tensioning members and the central axle together form an underlying dome support structure; and
   a skin-like covering overlying at least a portion of the underlying dome support structure to form at least a portion of the aerodynamic dome component and define a front dome portion that provides blockage of an incoming wind flow and redirecting of the incoming wind flow about a periphery of the front dome portion.

2. The aerodynamic dome component according to claim 1, wherein the skin-like covering overlying at least a portion of the underlying dome support structure further defines a rear dome portion, wherein the rear dome portion is configured downwind from the front dome portion.

3. The aerodynamic dome component according to claim 1, wherein the skin-like covering is comprised of fabric, metal, polycarbonate, plastic, composite, a composite sandwich panel, or a combination thereof.

4. The aerodynamic dome component according to claim 1, wherein the skin-like covering comprises a plurality of pie-shaped segments when viewed from a direction substantially orthogonal to an outermost surface of the skin-like covering.

5. The aerodynamic dome component according to claim 1, wherein the skin-like covering, overlying at least a portion of the underlying dome support structure and defining the front dome portion further comprises one or more vent openings formed therethrough the skin-like covering and configured to remain closed when the incoming wind flow is not of sufficient strength to open the one or more vent openings and to permit the incoming wind flow to pass through the one or more vent openings when the incoming wind flow is of sufficient strength to open the one or more vent openings to minimize wind impact.

6. The aerodynamic dome component according to claim 1, further comprising at least one of a bolt, a rivet, crimping, double-sided tape, a hook and loop element and a protrusion and slot structure coupling the skin-like covering to the underlying dome support structure.

7. The aerodynamic dome component according to claim 1, wherein the outer ring comprises a plurality of ring segments.

8. The aerodynamic dome component according to claim 1, further comprising a plurality of rotatable tension adjusters coupled to each of the plurality of radially extending tensioning members, wherein rotational movement of one of the plurality of rotatable tension adjusters or one of the plurality of radially extending tensioning members provides the increase or decrease in tension of the respective one of the plurality of radially extending tensioning members.

9. The aerodynamic dome component according to claim 1, wherein the outer ring comprises at least one of a channel-frame cross-section structure, a box-frame cross-section structure, an I-beam structure, and combinations thereof.

10. The aerodynamic dome component according to claim 1, wherein the plurality of radially extending tensioning members comprise a plurality of cables comprised of at least one of steel, carbon fiber and a high strength material.

11. An aerodynamic dome component for a wind turbine, the aerodynamic dome comprising:
   a skin-like covering; and
   an underlying dome support structure supporting the skin-like covering to define a front dome portion, the front dome portion providing blockage of an incoming wind flow and redirecting of the incoming wind flow about a periphery of the front dome portion, the underlying dome support structure comprising;
   a central axle;
   at least one outer ring segment disposed about said central axle; and
   a plurality of radially extending tensioning members coupled to the at least one outer ring segment at a first end and to the central axle at a second end and configured to allow for an increase or decrease in tensioning of the radially extending tensioning members in response to a rotational force exerted on each of the plurality of radially extending tensioning members.

12. The aerodynamic dome component according to claim 11, wherein the skin-like covering overlying at least a portion the underlying dome support structure further defines a rear dome portion, wherein the rear dome portion is configured downwind from the front dome portion.

13. The aerodynamic dome component according to claim 12, wherein the front dome portion is larger than the rear dome portion.

14. The aerodynamic dome component according to claim 11, wherein the skin-like covering, overlying at least a portion of the underlying dome support structure and defining the front dome portion, further comprises one or more vent openings formed therethrough the skin-like covering and configured to remain closed when the incoming wind flow is not of sufficient strength to open the one or more vent openings and to permit the incoming wind flow to pass through the one or more vent openings when the incoming wind flow is of sufficient strength to open the one or more vent openings to minimize wind impact.

15. The aerodynamic dome component according to claim 11, wherein the skin-like covering comprises a plurality of pie-shaped segments when viewed from a direction substantially orthogonal to an outermost surface of the skin-like covering.

16. A method of assembling an aerodynamic dome component for a wind turbine, the method comprising:
   providing a central axle;
   interconnecting a plurality of arcuate ring segments to form an outer ring having one of a parabolic or semi-spherical outer shape disposed about the central axle;
   coupling a plurality of radially extending tensioning members to the outer ring and the central axle to form an underlying dome support structure;
   exerting a rotational force on one or more of the plurality of radially extending tensioning members thereby adjusting the tension of a respective radially extending tensioning member of the plurality of radially extending tensioning members to provide one of an increase or decrease of the tension; and
   attaching via at least one of a bolt, a rivet, crimping, double-sided tape, a hook and loop element and a protrusion and slot structure a skin-like covering to the underlying dome support structure to form a front dome portion that provides blockage of an incoming wind flow and redirecting of the incoming wind flow about a periphery of the front dome portion.

17. The method according to claim 16, wherein the step of attaching via at least one attachment mechanism, the skin-like covering to the underlying dome support structure further defines a rear dome portion, wherein the rear dome portion is configured downwind from the front dome portion.

18. The method according to claim 16, wherein the skin-like covering comprises a plurality of pie-shaped segments when viewed from a direction substantially orthogonal to an outermost surface of the skin-like covering and wherein each of the plurality of pie-shaped segments is selected from a fabric material, a metal material, a composite material, a composite sandwich material and a combination thereof.

19. The method according to claim 16, wherein the step of coupling a plurality of radially extending tensioning members to the outer ring and the central axle to form an underlying dome support includes coupling with a plurality of rotatable tension adjusters wherein rotational movement of one of the plurality of rotatable tension adjusters or one of the plurality of radially extending tensioning members provides the increase or decrease in tension of the respective one of the plurality of radially extending tensioning members.

* * * * *